United States Patent [19]

Karita

[11] Patent Number: 4,698,876

[45] Date of Patent: Oct. 13, 1987

[54] DOOR APPARATUS PARTIALLY SUPPORTED BY A MAGNETIC MECHANISM

[75] Inventor: Mitsuji Karita, Mie, Japan

[73] Assignee: Shinko Electric Co., Ltd., Tokyo, Japan

[21] Appl. No.: 841,157

[22] Filed: Mar. 19, 1986

[30] Foreign Application Priority Data

Mar. 20, 1985 [JP] Japan .............................. 60-40421[U]
Mar. 20, 1985 [JP] Japan .............................. 60-40422[U]
Mar. 20, 1985 [JP] Japan .............................. 60-40423[U]
May 21, 1985 [JP] Japan .............................. 60-75382[U]

[51] Int. Cl.⁴ ........................................... E05D 15/06
[52] U.S. Cl. .................................... 16/102; 16/87 R; 49/409
[58] Field of Search ................... 16/102, 87 R, 89, 90, 16/91, 98, 101, 102; 49/409; 248/206.5, 309.4; 160/DIG. 16; 104/281, 284, 286, 290

[56] References Cited

U.S. PATENT DOCUMENTS

| | | | |
|---|---|---|---|
| 1,881,015 | 10/1932 | Ayers | 49/409 |
| 3,346,443 | 10/1967 | Johnson | 49/409 |
| 3,413,759 | 12/1968 | Baudot . | |
| 3,441,331 | 4/1969 | Kesling | 248/206.5 |
| 3,667,398 | 6/1977 | English | 104/290 |
| 3,741,613 | 6/1973 | Pfaler | 104/281 |
| 3,937,149 | 2/1976 | Winkle et al. . | |
| 4,072,110 | 2/1978 | Jayawant | 104/284 |
| 4,381,876 | 5/1983 | Fenwick | 312/114 |
| 4,452,014 | 6/1984 | Markus | 49/409 |
| 4,473,259 | 9/1984 | Goldowsky | 104/284 |

FOREIGN PATENT DOCUMENTS

| | | |
|---|---|---|
| 417134 | 7/1967 | Australia . |
| 121007 | 10/1984 | European Pat. Off. . |
| 2336310 | 2/1975 | Fed. Rep. of Germany . |
| 2925867 | 1/1981 | Fed. Rep. of Germany . |
| 1580187 | 7/1969 | France . |
| 2141088 | 1/1973 | France . |

Primary Examiner—Fred Silverberg
Attorney, Agent, or Firm—Scully Scott, Murphy and Presser

[57] ABSTRACT

A door apparatus includes a door movable between a closed position and an open position with respect to a stationary structure, and a support device for supporting the door. The support device includes a magnet mounted on one of the door and the stationary structure, and a member of a magnetic material mounted on the other of the door and the stationary structure. The magnet and said magnetic member cooperates with each other to produce a magnetic force therebetween to support at least part of the weight of the door.

9 Claims, 18 Drawing Figures

DOOR APPARATUS PARTIALLY SUPPORTED BY A MAGNETIC MECHANISM

BACKGROUND OF THE INVENTION

1. Field of the Invention

This invention relates generally to a door apparatus for supporting a door movable relative to a stationary structure between open and closed positions and more particularly to a door apparatus best suited for an automatic door.

2. Prior Art

Long time has elapsed since the mane of "clean room" has been heard and, recently, the clean room has widely been utilized in the field of assembly of precision machine components, in the field of food processing, or in other various fields.

The normal environment in which we live contains a huge number of fine dusts, dirts and fungi adhering thereto. The fine dusts would result in defects or faults in the precision components upon the manufacturing and assembling steps thereof, and would result in decomposition in the food upon the processing thereof. The clean room provides an environment required for the above-described assembling and processing. The clean room is isolated from the outside and is extremely reduced in amount of the fine dusts which would result in the above-described defects or faults and decomposition.

Careful attention is required for a door of a doorway to the clean room in order to prevent the fine dusts from entering the clean room or from being produced within the clean room. Conventional door apparatuses for the clean room will be described with reference to FIGS. 1 and 2. A door 1 is hung by two rollers 2 and 3 from a rail 4 which extends horizontally and is fixedly secured to a wall 5 at a position above a doorway 6 therein such that the door 1 is movable along the rail 4. The rollers 2 and 3 are connected to the door 1 by hanging members 7 and 8, respectively. An upper end of one of the hanging members 7 is fixedly attached to a lower run of a belt 9 trained around a pair of pulleys 11 and 12. The pulley 11 is rotatably mounted on the wall 5 at a position above the rail 4, and the pulley 12 is mounted on an output shaft of a motor 13 for rotation therewith, which is fixedly secured to the wall 5 at a position above the rail 4. The motor 13 is operative in response to a signal from a sensor incorporated in a doormat on a floor, a supersonic or optical sensor disposed adjacent the doorway 6, or the like, to rotate the pulley 12 to thereby move the door 4 connected to the belt 9 between a first position where the door 4 closes the doorway 6 and a second position where the door 4 opens the doorway 6.

Figure 3:
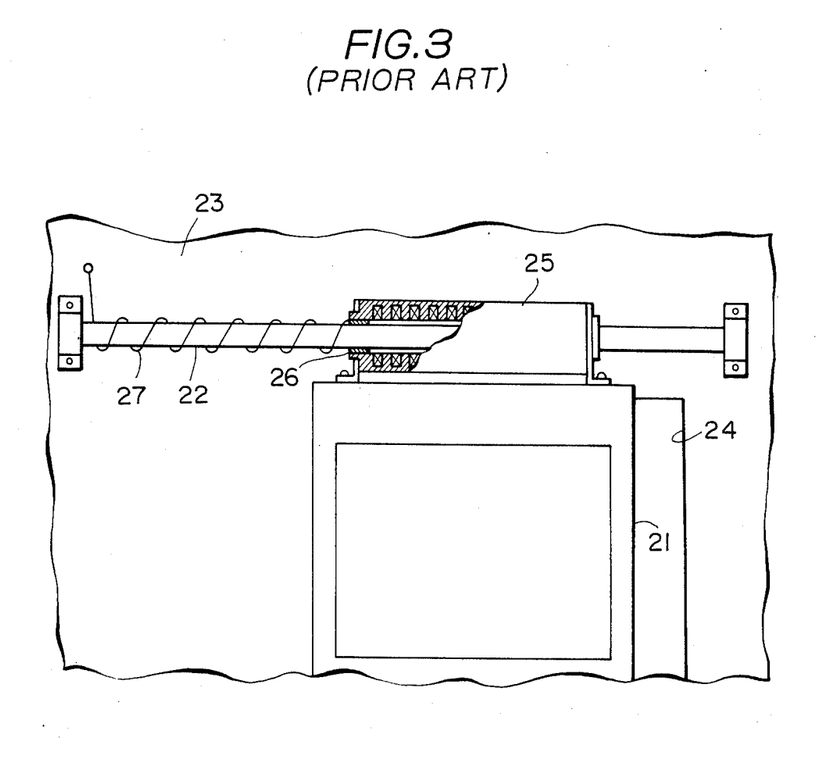
FIG. 3 is a fragmental, partially broken-away front elevational view showing another conventional door apparatus.

Another conventional door apparatus for use at a doorway to the clean room is shown in FIG. 3. A door 21 is driven by a linear motor of a rod type. Spcifically, a rod 22 is fixed to a wall 23 at a location above a doorway 24 therein so as to extend horizontally. A tubular unit 25 for generating traveling or shifting magnetic field is fixedly mounted on a top of the door 21 and is fitted around the rod 22. Annular sliding bearings 26 mounted on the tubular unit 25 enable the same to be smoothly moved along the rod 22 with the door 21 being hung from the rod 22 by the tubular unit 25. When electric current is supplied to the tubular unit 25 through a curled cable 27, the traveling magnetic field is generated between the tubular unit 25 and the rod 22 whereby the tubular unit 25 is moved along the rod 22 and the door 21 is moved between a position where the door 21 closes the doorway 24 and a position where the door 21 opens the doorway 24.

Figures 1, 2:
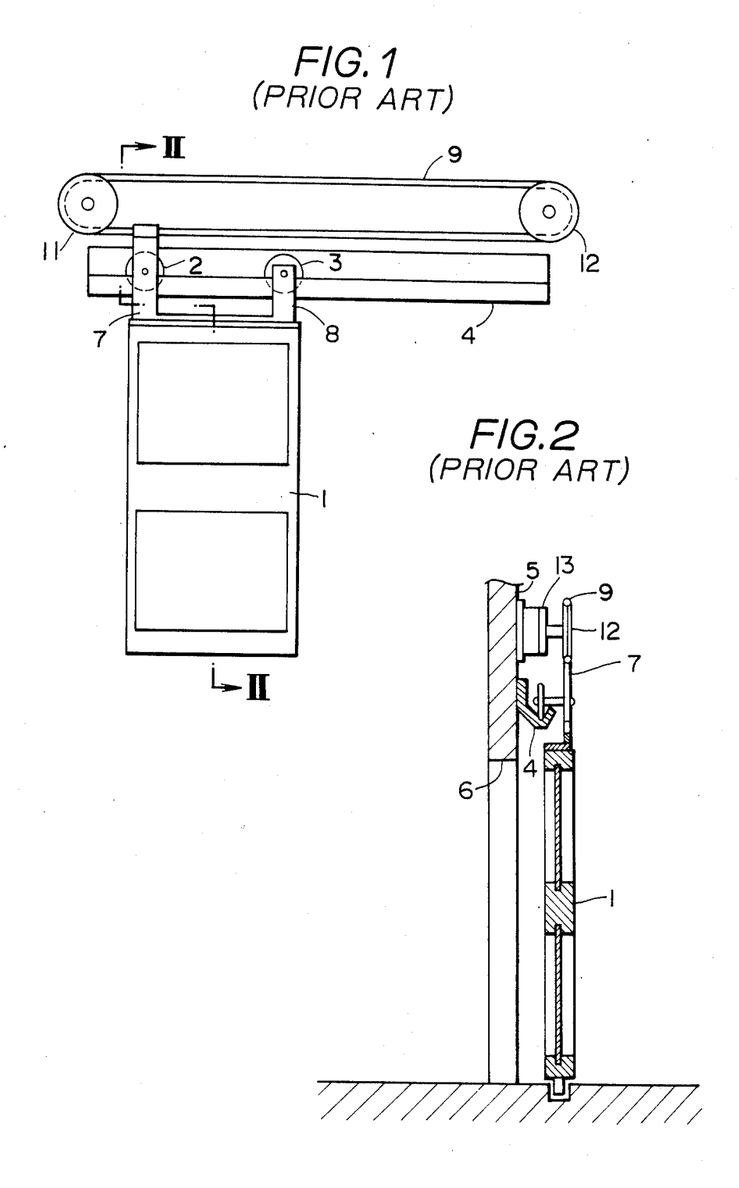
FIG. 1 is a front elevational view showing a conventional door apparatus.
FIG. 2 is a cross-sectional view taken along the line II—II of FIG. 1.

A further conventional door apparatus is known in which a door is hung from a rail by rollers as shown in FIGS. 1 and 2, and is driven by a linear motor of a flat type or by a hydraulic mechanism.

In the above-described conventional door apparatuses, however, the entire weight or load of the door acts on the contact portions such as roller, sliding bearings or the like, and dusts are unavoidably produced at the contact portions. In addition, since the contact portions are located above the door, the fine dusts fall down and the circumference would be contaminated by the fine dusts.

SUMMARY OF THE INVENTION

An object of the present invention is to provide a door apparatus which can reduce the load acting on the contact portions.

Another object is to provide a door apparatus which has no contact portion.

A further object is to provide a door apparatus which can restrict or restrain the production of dusts upon the movement of the door.

According to the present invention, there is provided a door apparatus comprising:

(a) a door movable between a closed position and an open position with respect to a stationary structure; and (b) support means for supporting said door, said support means comprising magnet means mounted on one of said door and said stationary structure, and a member of a magnetic material mounted on the other of said door and said stationary structure, said magnet means and said magnetic member cooperating with each other to produce a magnetic force therebetween for supporting at least part of the weight of said door.

DESCRIPTION OF THE PREFERRED EMBODIMENTS OF THE INVENTION

The invention will now be described with reference to the drawings in which like reference numerals denote corresponding parts in several views.

Figure 4:
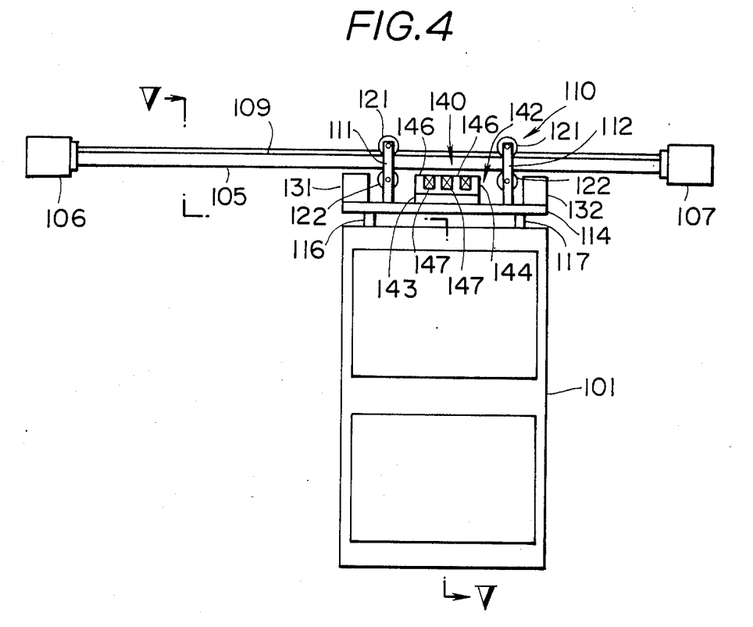
FIG. 4 is a front elevational view showing a first embodiment of a door apparatus in accordance with the present invention.
Figure 5:
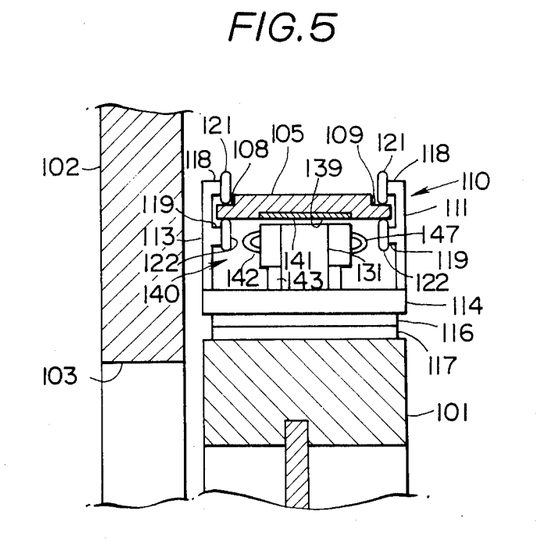
FIG. 5 is a cross-sectional view taken along the line V—V in FIG. 4.

FIGS. 4 and 5 show a door apparatus according to a first embodiment of the present invention. A door 101 is movable relative to a stationary structure or a vertical wall 102 between a first or closed position where the door 101 closes a doorway 103 provided in the wall 102 and leading to a clean room and a second or open position where the door 101 opens the doorway 103.

An elongated guide member 105 has upper and lower horizontal surfaces, and the opposite ends of the guide member 105 are fixedly mounted on the wall 102 by brackets 106 and 107, respectively, at a position above the doorway 103. Stepped portions 108 and 109 are formed along the opposite sides of the upper surface of the guide member 105, respectively. A slidable mechanism, generally designated by reference numeral 110, comprises two pairs of opposed vertical hanging members 111, 112 and 113. The hanging members 111 to 113 have their respective lower ends fixed to a horizontal plate member 114 which is fixedly connected to a top of the door 101 through a pair of attaching blocks 116 and 117. Each of the hanging members 111 to 113 has a pair of upper and lower pins 118 and 119. The slidable mechanism 110 further comprises upper and lower rollers 121 and 122 rotatably mounted on the upper and lower pins 118 and 119 of each hanging member, respectively. the four upper rollers 121 form a first set of rollers which are in rolling contact with upper surfaces of the respective stepped portions 108 and 109, and the four lower rollers 122 form a second set of rollers which are in rolling contact with lower surfaces of the respective stepped portions 108 and 109, so that the guide member 105 is positioned between the first and second sets of roller. Thus, the slidable mechanism 110 is mounted on the elongated guide member 105 so as to be slidable therealong and is fixedly connected to the door 101, to hang the same from the guide member 105. And, the slidable mechanism 110 serves as connecting means operatively connecting the door 101 to the guide member 105 for guiding the movement of the door 101 along the guide member 105.

The elongated guide member 105 is made of a magnetic material such as steel. A pair of permanent magnets 131 and 132 having a predetermined magnetic force are fixedly mounted on opposite ends of the upper surface of the plate member 114 and disposed centrally of the width of the plate member 114, so that the upper surface of each permanent magnet 131, 132 faces the lower surface of the guide member 105 and is slightly spaced therefrom. The permanent magnets 131 and 132 produce magnetic attractive force exerted on the guide member 105 of a magnetic material to support at least part of the weight of the door 101. Thus, these magnets 131 and 132 and the guide member 105 constitute a support means for the door 101. The attractive force applied to the guide member 105 by the permanent magnets 131 and 132 is of such a magnitude as to correspond to the sum of the weight of the door 101 and various components mounted thereon. Therefore, the rollers 121 and 122 are subjected to extremely small load.

A recess 139 is formed in the lower surface of the elongated guide member 105 and extends along the longitudinal axis thereof throughout the entire length thereof. A drive mechanism, generally designated at 140, comprises an elongated plate member 141 of a non-magnetic conductive material such as copper and aluminum. The plate member 141 is received in the recess 139 and fixed to the guide member 105, and the lower surface of the plate member 141 is disposed substantially flush with the lower surface of the guide member 105. A traveling or shifting magnetic field-generating unit 142 is fixedly mounted on the plate member 114 by an attaching block 143 and is located centrally of the two permanent magnets 131 and 132. The unit 142 comprises an elongated yoke 144 having a longitudinal axis extending parallel to the guide member 105. The yoke 144 has a comb-like shape having a plurality of magnetic pole portions 146 around which coils 147 are wounds, respectively, the coils 147 being spaced from each other along the longitudinal axis of the yoke 144. The unit 142 cooperates with the plate member 141 of a non-magnetic conductive material to form a linear motor. Specifically, when electric current is caused to pass through the coils 147 with a predetermined phase difference, the unit 142 generates the traveling magnetic field along the longitudinal axis of the elongated yoke 144, to thereby impart a driving or propelling force to the door to move the same along the elongated guide member 105 between the above-mentioned first and second positions.

When the door 101 is moved along the guide member 105 by the traveling magnetic field produced by the traveling magnetic field-generating unit 142, the rollers 121 and 122 are subjected to an extremely small load since the door 101 is mostly supported through the magnetic attractive force produced by the permanent magnets 131 and 132. Therefore, the generation of dust and dirt is limited to a minimum, thereby the contamination of the room is kept to a low level. In addition, the door apparatus is simple in construction and less costly to manufacture.

The plate member 141 is provided integrally with the guide member 105, but it may be provided in spaced relation to the guide member 105. In addition, in the illustrated embodiment, although the door 101 is driven by the linear motor for movement, the drive may be driven by any other suitable drive mechanism such as a motor-driven pulley and belt arrangement as shown in FIGS. 1 and 2. Also, the drive mechanism may be omitted in which case the door 101 is manually moved.

Figure 6:
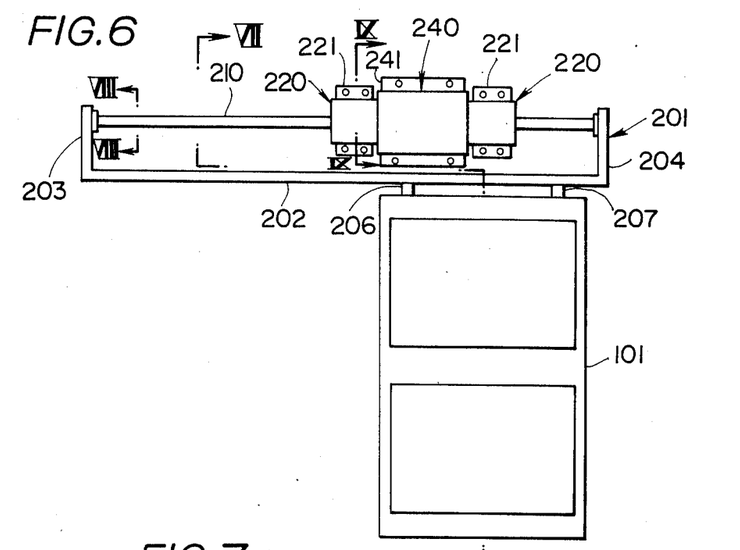
FIG. 6 is a view similar to FIG. 4, but showing a second embodiment of the present invention.

A door apparatus according to a second embodiment of the invention will now be described with reference to the drawings. The door apparatus comprises a U-shaped frame 201 having a horizontally-extending base 202 and vertical legs 203 and 204 formed integrally on the opposite ends of the base 202, respectively. A door 101 has a top fixedly secured to the base 202 at a position adjacent to the leg 204 through a pair of hanging members 206 and 207. The door 101 is disposed vertically in a plane in which the base 202 lies.

Figure 8:
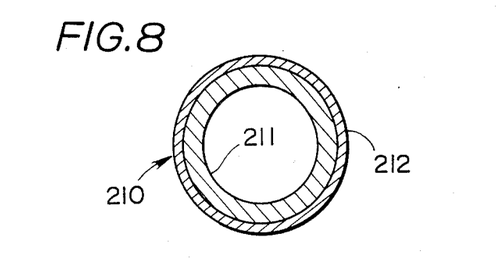
FIG. 8 is an enlarged cross-sectional view taken along the line VIII—VIII in FIG. 6.

An elongated guide member 210 of a circular cross-section has opposite ends fixedly secured to the legs 203 and 204, respectively, so as to extend in parallel relation to the base 202. As shown in FIG. 8, the guide member 210 comprises an inner pipe 211 made of a magnetic material such as steel, and an outer pipe 212 made of a non-magnetic conductive material such as copper. The inner and outer pipes 211 and 212 are connected together in concentric relation.

Figure 9:
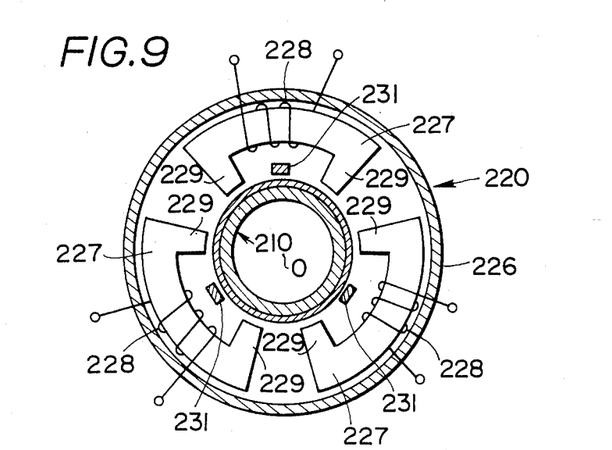
FIG. 9 is an enlarged cross-sectional view taken along the line IX—IX in FIG. 6.

A pair of electromagnet units 220 of the identical structure are fixedly mounted on a stationary structure or vertical wall 102 by means of mounting members 221. The electromagnet units 220 are spaced from each other along the elongated guide member 210 and are disposed so as to surround the guide member 210. As shown in FIG. 9, each of the electromagnet units 220 comprises a cylindrical casing 226 disposed in concentric relation to the guide member 210, and three cores 227 disposed within the casing 226 in surrounding relation to the guide member 210. The cores 227 are circumferentially spaced from each other through 120°. Each of the cores 227 is of a generally C-shaped and has a coil 228 wound therearound. Each core 227 has two magnetic poles 229 which face an outer peripheral surface of the guide member 210. The free end faces of the magnetic poles 229 are spaced equidistantly from the center O of the guide member 210, and the distance between the center O and the free end face of each magnetic pole 229 is greater than the radius of the guide member 210 so that the magnetic poles 229 are spaced radially from the outer peripheral surface of the guide member 210. A distance sensor 231 is associated with each of the cores 227. The sensor 231 is of the induction type or of the eddy current type and is disposed between the poles 229 of each core 227. As electric current is caused to pass through the coils 228, the cores 227 are excited so that the magnetic poles 229 attract the inner pipe 211 of the guide member 210. When the cores 227 are excited, each sensor 231 detects the distance between the magnetic poles 229 of ech core 227 and the outer peripheral surface of the guide member 210 to generate a signal representative of the distance. The electric current supplied to the coils 228 is controlled based onthe signals from the respective sensors 231 such that the respective radial distances between the magnetic poles 229 and the outer peripheral surface of the guide member 210 are rendered substantially equal to each other so that the guide member 210 is supported in space in a non-contact manner. Thus, the electromagnet units 220 and the inner pipe 211 of a magnetic material cooperates with each other to support the weight of the door 101 through the magnetic attractive force produced by the electromagnet units 220 and therefore serve as a support mechanism for the door 101.

Figure 10:
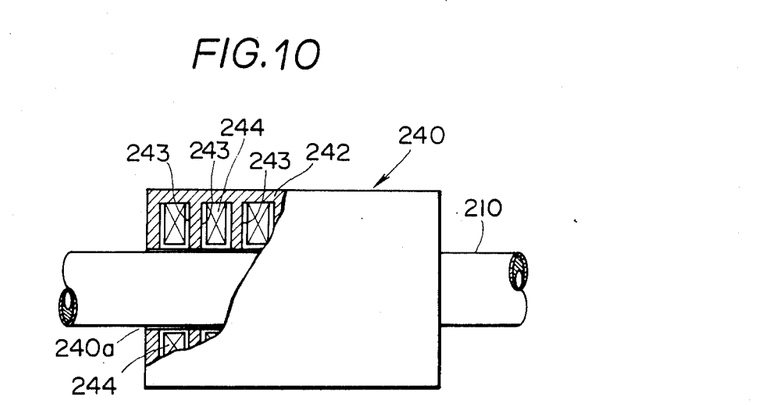
FIG. 10 is an enlarged fragmental, partially broken-away side elevational view showing a traveling magnetic field generating unit shown in FIG. 6.

A unit 240 for generating traveling magnetic field is fixedly mounted on the wall 102 at a location between the pair of electromagnet units 220 by means of a mounting member 241. As shown in FIG. 10, the unit 240 comprises an annular core 242 having a central opening 240a therethrough through which the elongated guide member 210 passes so that the core 242 is disposed so as to surround the elongated guide member 210. A plurality of annular recesses 243 are formed in an inner peripheral surface of the core 242 in concentric relation thereto and are spaced from each other along the guide member 210. An annular coil 244 is received in each of the annular recesses 243 in concentric relation to the guide member 210. The inner peripheral surface of the core 242 has a diameter slightly greater than that of the guide member 210 so that an annular gap is provided therebetween. The unit 240 and the outer pipe 212 of a non-magnetic conductive material cooperate with each other to form a linear motor serving as a drive mechanism which is operable to drive the door 101 to move between a first position where the door 101 closes a doorway 103 (FIG. 7) and a second position where the door 101 opens the doorway 103.

Figure 7:
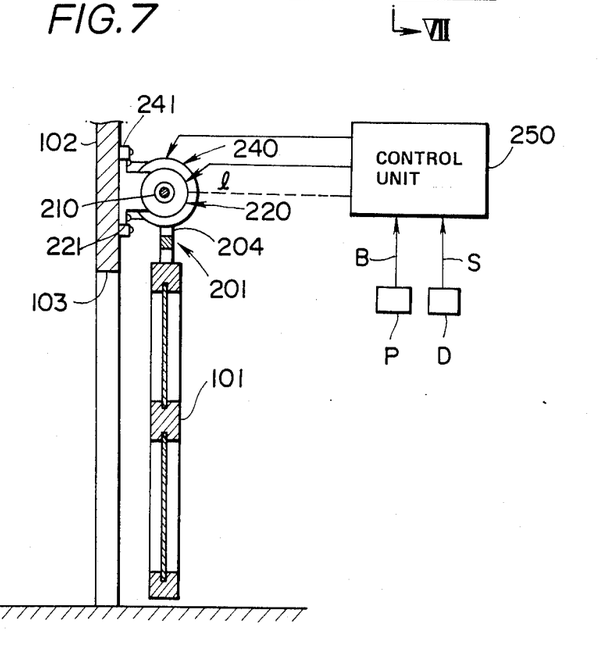
FIG. 7 is a cross-sectional view taken along the line VII—VII in FIG. 6.

As shown in FIG. 7, there is provided a control unit 250 which is operative in response to the signals 1 from the respective sensors 231 to control the electric current supplied to the coils 228 of the electromagnet units 220 to cause the door 101 to be supported in spaced in a non-contact manner. The control unit 250 is also operative in response to a door-opening signal S from a sensor D and a door-position signal B from a position sensor P, which detects the closed position of the door 101, to operate the traveling magnetic field-generating unit 240 to thereby move the door 101 between the first and second positions. The sensor D is pressure-sensitive sensor incorporated in a doormat on a floor, a supersonic sensor or an optical sensor the latter two of which are disposed in the vicinity of the door way 103.

With the door apparatus in this embodiment, the control unit 250 is operative in response to the sensing signals 1 from the respective distance sensors 231 to control the electric current supplied to the respective coils 228 of the electromagnet units 220, so that the guide member 210 is supported in space in a non-contact manner, that is to say, in spaced relation to the cores 227. Therefore, the door 101 fixedly secured to the guide member 201 is also supported in space in a non-contact manner. When the door-opening signal S is fed from the sensor D to the control unit 250, the unit 240 generates the traveling magnetic field traveling in one direction, so that the frame 201 is moved longitudinally horizontally together with the door 101 to bring the door 101 toward its second or closed position so as to open the doorway 103. When the door 101 reaches a location near its closed position, the position sensor P is operated to feed the position signal B to the control unit 250 whereupon the direction of travel of the traveling magnetic field produced by the unit 240 is reversed for a predetermined short period of time to apply a braking action to the door 101 to positively stop the door 101. The control unit 250 is also responsive to the above position signal B to cause the unit 240 to produce a traveling magnetic field in the other or reverse direction a predetermined period of time after the stop of the door 101 in its closed position, thereby moving the door 101 together with the frame 201 toward its open position.

Figure 11:
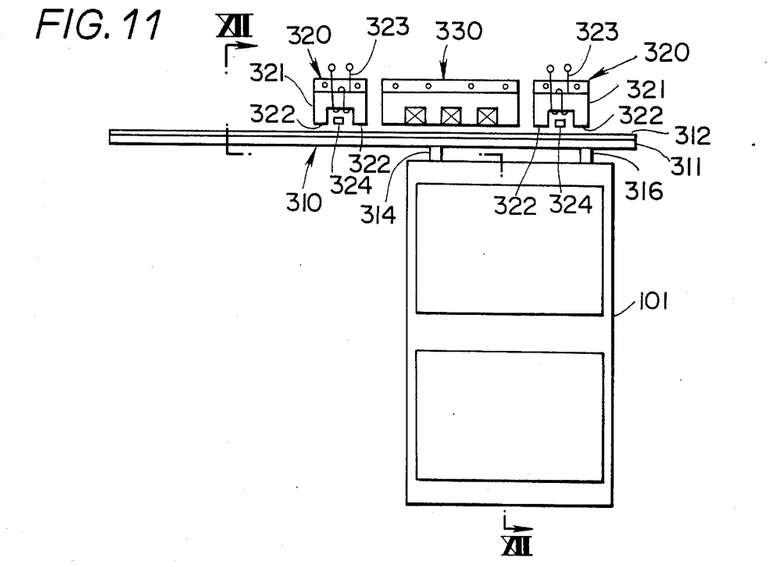
FIG. 11 is a view similar to FIG. 4, but showing a third embodiment of the present invention.
Figure 12:
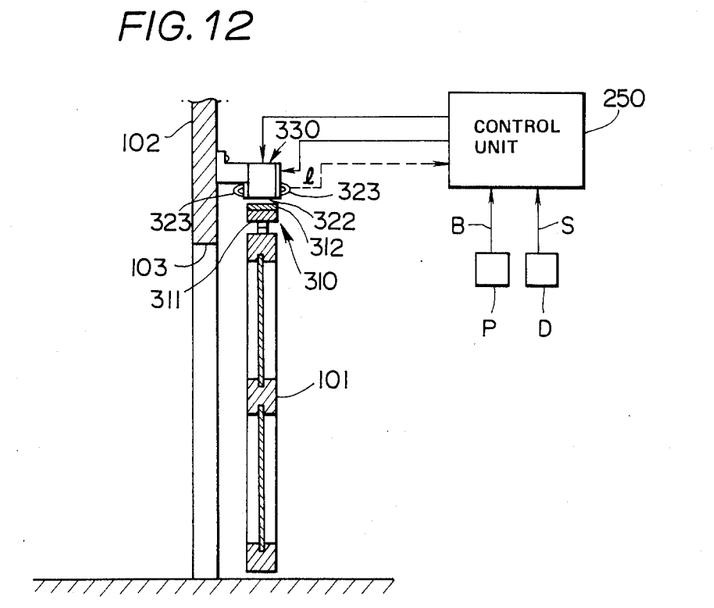
FIG. 12 is a cross-sectional view taken along the line XII—XII in FIG. 11.

FIGS. 11 and 12 show a door apparatus according to a third embodiment of the present invention. An elongated guide member 310 extends substantially horizontally and comprises a plate member 311 made of a magnetic material such as steel and having upper and lower planar surfaces, and another plate member 312 made of a non-magnetic conductive material such as copper, aluminum. The plate member 312 is mated with and secured to the upper surface of the plate member 311 so as to extend therealong. A door 101 has a top fixedly secured to the guide member 310 by a pair of hanging members 314 and 316 at a location adjacent one end of the guide member 310.

A pair of electromagnet units 320 are fixedly mounted on a stationary structure or a vertical wall 102 and are spaced from each other along the guide member 310. Each of the electromagnet units 320 comprises a generally inverted U-shaped core 321 having two magnetic poles 322 which are directed downwardly toward the upper planar surface of the guide member 310. A coil 323 is wound around the core 321 of each unit 320. A distance sensor 324 similar to the distance sensors 231 (FIG. 9) is associated with each core 321, and is located between the magnetic poles 322 thereof. As electric current is caused to pass through the coils 323 of the respective units 320, the cores 321 are excited to attract the magnetic plate 311 of the guide member 310. The sensors 324 detect the respective distances between the magnetic poles 322 and the upper surface of the guide member 310 to produce respective signals. Under the control of the control unit 250, the electric current supplied to the coils 323 is so controlled that the magnetic poles are spaced at an equal distance from the upper surface of the guide member 310 to suspend the door 101 together with the guide member 310 in space in a non-contact manner.

A traveling magnetic field-generating unit 330 is fixedly mounted on the wall 102 at a position between the two electromagnet units 320 so as to face the upper surface of the guide member 310. The unit 330 is similar in construction to the unit 142 in FIGS. 4 and 5. The unit 330 cooperates with the non-magnetic conductive plate 312 of the guide member 310 to form a linear motor. The door apparatus in this embodiment operates in a manner similar to the door apparatuses of the preceding embodiments.

In the second and third embodiments mentioned above, although the electromagnet units 220 and 320 and the traveling magnetic field-generating units 240 and 330 are fixedly mounted onthe wall 102, they may be fixedly mounted on the door 101 in which case the guide member 210, 310 and the frame 201 are fixedly mounted on the wall 102.

Figures 13, 14:
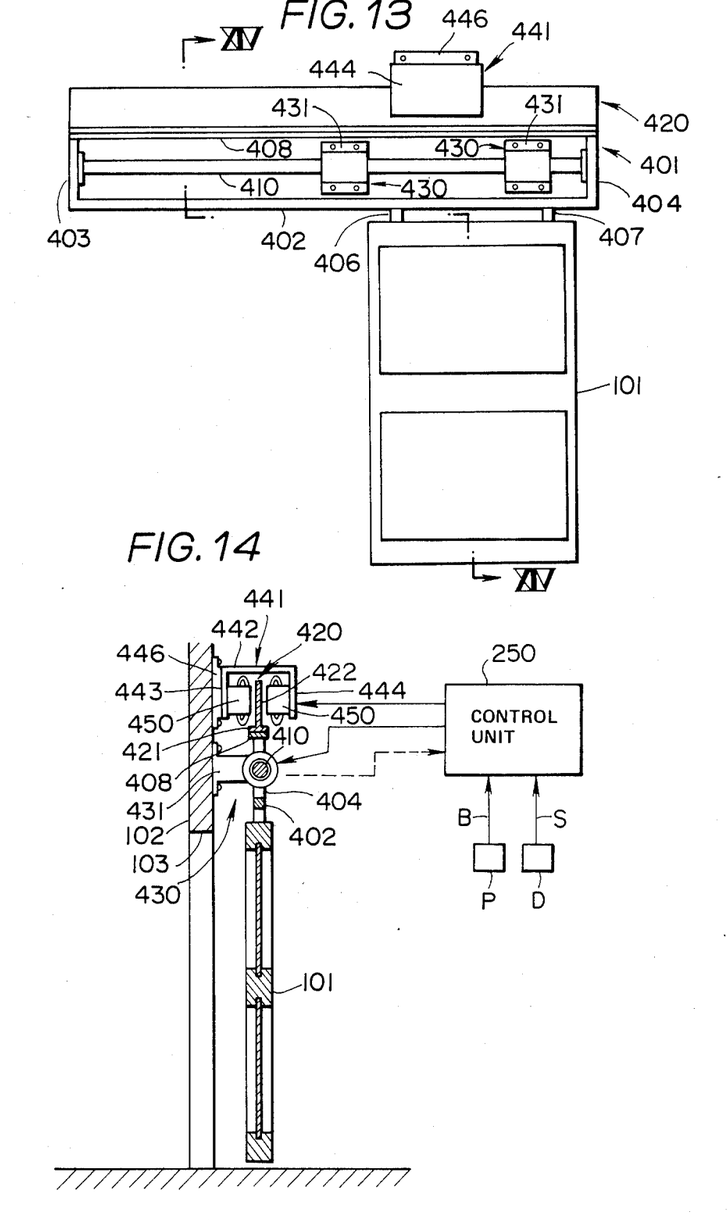
FIG. 13 is a view similar to FIG. 4, but showing a fourth embodiment of the present invention.
FIG. 14 is a cross-sectional view taken along the line XIV—XIV in FIG. 13.

FIGS. 13 and 14 show a door apparatus according to a fourth embodiment of the present invention. The door apparatus comprises a frame 401 similar to the frame 201 of FIG. 6. A door 101 has a top fixedly secured to a horizontally-extending base 402 of the frame 401 by means of a pair of hanging members 406 and 407 at a location adjacent one of legs 403 and 404 of the frame 401. The door 101 is disposed in a plane in which the base 402 lies.

An elongated guide member 410 has opposite ends fixedly secured to the legs 403 and 404, respectively, and extending parallel to the base 402. The guide member 410 comprises a rod which has a circular cross-section and is made of a magnetic material such as steel. An elongated plate 408 extends between the free ends of the legs 403 and 404 and is fixedly secured thereto. An elongated plate member 420 having T-shaped cross-section is fixedly secured to the plate 408 so as to extend therealong. The plate member 420 is made of a non-magnetic conductive material such as aluminum and comprises a horizontal portion 421 and a vertical portion 422 extending upwardly therefrom. The horizontal portion 421 is fixedly attached to the plate 408.

A pair of electromagnet units 430 are fixedly mounted on the wall 102 by means of mounting members 431 so as to surround the guide member 410. The units 430 are spaced from each other along the guide member 410. The electromagnet units 430 are identical in structure to the units 220 of FIG. 9.

A channel member 441 is fixedly secured to the wall 102. The channel member 441 has an inverted U-shaped cross-section and has a horizontal base 442 and vertical legs 443 and 444 depending from the opposite sides of the base 442, respectively. The leg 443 is fixedly attached to the wall 102 by means of a mounting member 446. The vertical portion 422 of the plate member 420 is located between the legs 443 and 444. A pair of traveling magnetic field generating units 450 are fixedly secured to the inner surfaces of the legs 443 and 444, respectively, so as to face the opposite sides of the vertical portion 422 of the plate member 420 in spaced relation thereto. Each of the units 450 is identical in structure to the unit 142 of FIG. 4. The units 450 cooperate with the plate member 420 of the non-magnetic material to form a linear motor.

The control unit 250 is responsive to signals 1 from distance sensors similar to the sensors 231 of FIG. 9 to control electric current supplied to coils similar to the coils 228 of FIG. 9, so that the guide member 410 is suspended in space in a non-contact manner together with the door 101 as described above for the preceding embodiments. When a door-opening signal S is fed from the sensor D to the control unit 250, the units 450 generate the traveling magnetic field to move the door 101 from its first to second positions, and the door 101 is returned to its first position as described above for the preceding embodiments.

Figure 15:
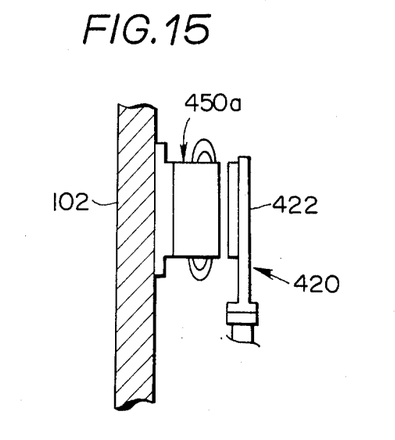
FIG. 15 is a fragmental view showing a modification of the fourth embodiment shown in FIGS. 13 and 14.

In this embodiment, although the electromagnet units 430 and the traveling magnetic field-generating units 450 are fixedly mounted on the wall 102, they may be fixedly mounted on the door 101 in which case the guide member 410 and the plate member 420 are fixedly mounted on the wall 102. Also, the linear motor comprising the traveling magnetic generating units 450 may be replaced by one comprising a single unit 450a (FIG. 15) which is fixedly mounted on the wall 102 in opposed relation to the inner side of the vertical portion 422 of the plate member 420.

Figure 16:
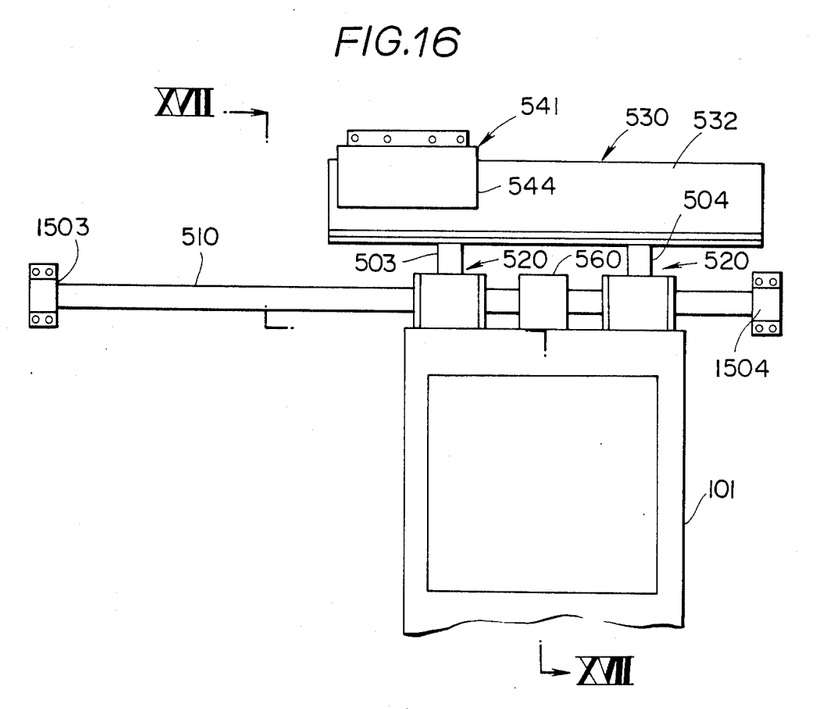
FIG. 16 is a view similar to FIG. 4, but showing a fifth embodiment of the present invention.
Figure 17:
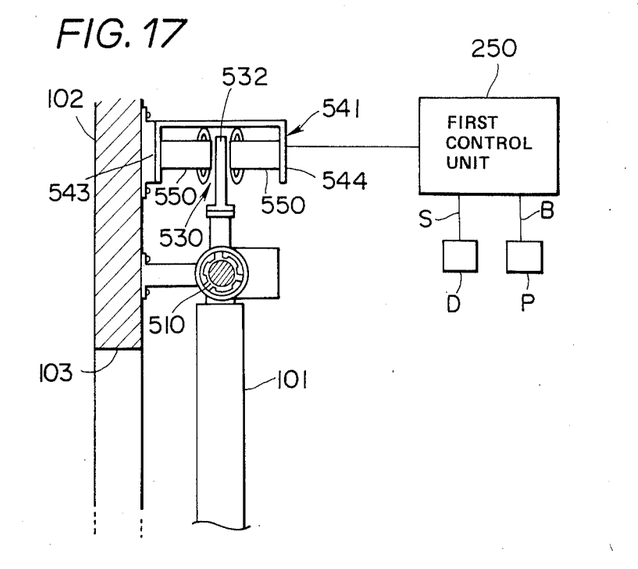
FIG. 17 is a cross-sectional view taken along the line XVII—XVII in FIG. 16.
Figure 18:
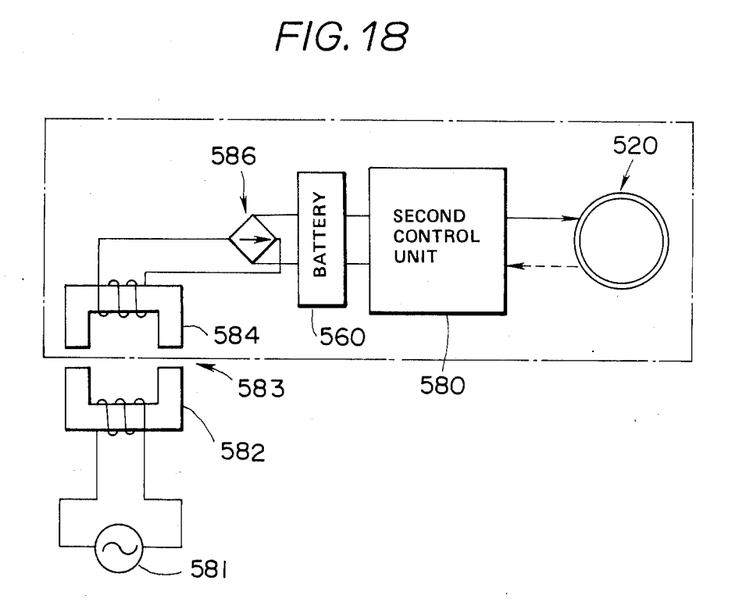
FIG. 18 is a block diagram showing magnet units shown in FIGS. 16 and 17 supplied with electric current from a battery.

FIGS. 16 to 18 show a door apparatus according to fifth embodiment of the present invention. The door apparatus comprises an elongated guide member 510 extending horizontally and having opposite ends fixedly secured to a wall 102 by means of brackets 503 and 504, respectively. The guide member 510 comprises a rod having a circular cross-section and made of a magnetic material such as steel.

A pair of electromagnet units 520 are fixedly mounted on a top of a door 101 movable between a first or closed position and a second or open position. The units 520 are identical in structure to the electromagnet units 220 of FIG. 9.

An elongated plate member 530 is fixedly connected to the units 520 by a pair of vertical connecting members 1503 and 1504. The plate member 530 is made of a non-magnetic conductive material such as aluminum and is similar to the plate member 420 of FIGS. 13 and 14.

A channel member 541 similar in structure to the channel member 441 of FIGS. 13 and 14 is fixedly mounted on the wall 102 with a vertical portion 532 of the plate member 530 being disposed between opposite legs 543 and 544 of the channel member 541. A pair of traveling magnetic field-generating units 550 are fixedly secured to the inner surfaces of the legs 543 and 544 of the channel member 541, respectively, so as to face the opposite sides of the vertical portion 532 of the plate member 530 in spaced relation thereto. The units 550 are identical in structure to the units 450 of FIGS. 13 and 14.

A battery 560 is fixedly mounted on the top of the door 101 at a location between the electromagnet units 520 for supplying electric current to them. A first control unit 250 similar to those in the preceding embodiments and a second control unit 580 (FIG. 18) are provided. Referring to Fig. 18, the components enclosed by by a dot-and-dash line are mounted on the door 101, and the other components are mounted on a stationary structure such as the wall 102 or the floor. As alternating current is supplied from an outside power source 581 to a primary coil 582 of a charging unit 583, alternating current is induced in a secondary coil 584 of the charging unit 583, which is mounted on the door 101. The primary and secondary coils 582 and 584 are disposed in facing relation, that is, in registry with each other, when the door 101 is in its first or closed position, so that the alternating current is induced in the secondary coil 584. When the door 101 is moved from the first to second position, the secondary coil 584 is brought out of registry with the primary coil 582, thereby stopping the induction of the alternating current in the secondary coil 584. The alternating current induced in the secondary coil is rectified to DC current through a rectifier 586, and the DC current is supplied to the battery 560 to charge it. The second control unit 580 controls the supply of the DC current to the units 520.

The door 101 is normally in its first or closed position in which the alternating current is induced in the secondary coil 584. The second control unit 580 supplies the electric current from the battery 560 to coils of the electromagnet units 520 similar to the coils 228 of FIG. 9, and is responsive to signals from distance sensors similar to the sensors 231 of FIG. 9, so that the door 101 is supported or suspended in space in a non-contact manner as described above for the preceding embodiments.

As a door-opening signal S is fed to the first control unit 250, the traveling magnetic field traveling in the door-opening direction, i.e., in a left-hand direction (FIG. 16), is generated by the units 550 so that the door 101 is moved from the first to second position to open the doorway 103 as described above for the above embodiments. When the door 101 is moved toward its closed or second position, the induction in the secondary coil 584 is stopped, but the voltage of the battery 560 does not drop. And, the door 101 is returned to its first or closed position under the control of the first control unit 250 as described above for the preceding embodiments.

In this embodiment, although the battery 560 is charged with the power through the coils 582 and 584, a suitable electrical contact of the mechanical type may be used to supply DC power from the power source to the battery 580 in which case the rectifier 586 is omitted.

In this embodiment, the electric power is supplied from the battery 560, mounted on the door 101, to the units 520, and the battery 560 is charged while the door 101 is in its first or closed position. Thus, it is not necessary to provide a supply cable, such as a curled cable mounted above the door 101, for connecting the outside power source to the units 520, and therefore dust is not caused to drop from above the door 101 when the door is moved between its first and second positions. In addition, the use of the coils 582 and 584 enables the door 101 to move without making contact with any part of the door apparatus, which substantially reduces the production of dust and dirt. Further, since the guide member of the magnetic material such as steel 510 is mounted on the wall 102, the weight of the door 101 is reduced, and therefore the electricity consumed for suspending the door 101 in space is reduced.

What is claimed is:

1. A door apparatus comprising:
   a door movable between a closed position and an open position with respect to a stationary structure;
   support means for supporting said door, said support means comprising
   (i) magnet means mounted on one of said door and said stationary structure,
   (ii) a guide mechanism comprising rollers also mounted on the one of said door and said stationary structure, and
   (iii) an elongated guide member of a magnetic material mounted on the other of said door and said stationary structure,
   said magnet means and said magnetic member cooperating with each other to produce a magnetic force therebetween for supporting at least part of the weight of said door, and
   said elongated member also being connected to the guide mechanism for relative movement therebetween with said rollers continuously being in direct rolling contact with said elongated member on two sides thereof to also partially support said door, the elongated member and the guide mechanism cooperating with each other to guide movement of the door between the open and closed positions; and
   drive means for moving said door between the closed and open positions, and comprising non-magnetic conductive means mounted on one of said door and said stationary structure, and traveling magnetic field means mounted on the other of said door and said stationary structure for applying a traveling magnetic field to said non-magentic conductive means to impart a propelling force to said door to move it between the closed and open positions.

2. A door apparatus according to claim 1, in which said non-magnetic conductive means comprises an elongated plate fixedly secured to said elongated guide member and extends therealong, said traveling magnetic field means comprising an electromagnet disposed in opposed relation to said non-magnetic plate.

3. A door apparatus comprising:
   (a) a door movable between a closed position and an open position with respect to a stationary structure; and
   (b) support means for supporting said door, said support means comprising magnet means mounted on one of said door and said stationary structure, and a member of magnetic material mounted on the other of said door and said stationary structure, said magnet means and said magnetic member cooperating with each other to produce a magnetic force therebetween for supporting at least part of the weight of said door;
   wherein said magnet means comprises an electromagnet, there being provided battery means mounted on said door and electrically connected to said electromagnet for exciting it, there being provided charging means for charging said battery means, said charging means comprising a power source, a primary coil mounted on said stationary structure and connected to said power source, and a secondary coil mounted on said door and electrically connected to said battery means, said secondary coil being brought into electromagnetic coupling with said primary coil for charging said battery means when said door is in the closed position.

4. A door apparatus according to claim 3, in which said elongated guide member has a circular cross-section, said magnet means comprising electromagnet means having a plurality of electrically-excitable magnets each having magnetic poles, said magnetic poles being circumferentially spaced from each other around said guide member in spaced relation to an outer peripheral surface of said guide member, there being provided a plurality of sensors each for detecting a distance between a respective one of said magnetic poles and the outer peripheral surface of said guide member to produce a sensing signal representative of said distance, and there being provided control means responsive to said sensing signals from said plurality of sensors for controlling the excitation of each of said electrically-excitable magnets for spacing said magnetic poles at an equal distance from the outer peripheral surface of said elongated guide member.

5. A door apparatus according to claim 3, in which said magnet means comprising electromagnet means having a plurality of electrically-excitable magnets each having magnetic poles, said magnetic poles being spaced from each other along said guide member in spaced relation thereto, there being provided a plurality of sensors each for detecting a distance between a respective one of said magnetic poles and said guide member to produce a sensing signal representative of said distance, and there being provided control means responsive to said sensing signals from said plurality of sensors for controlling the excitation of each of said electrically-excitable magnets for spacing said magnetic poles at an equal distance from the outer peripheral surface of said elongated guide member.

6. A door apparatus according to claim 3, in which said non-magnetic conductive means comprises an elongated plate fixedly mounted to said elongated guide member and extends therealong, said non-magnetic plate being disposed vertically, said traveling magnetic field means comprises a pair of opposed electromagnets disposed on opposite sides of said non-magnetic plate in opposed relation thereto.

7. A door apparatus according to claim 3, in which said elongated guide member has a circular cross-section, said non-magnetic conductive means comprising an elongated tubular member fitted on and secured to said elongated guide member, said traveling magnetic field means comprising an electromagnet having a central opening extending therethrough, said elongated guide member and said non-magnetic member passing through said central opening of said electromagnet.

8. A door apparatus comprising:
(a) a door movable between a closed position and and open position with respect to a stationary structure; and
(b) support means for supporting said door, said support means comprising magnet means mounted on one of said door and said stationary structure, and a member of a magnetic material mounted on the other of said door and said stationary structure, said magnet means and said magnetic member cooperating with each other to produce a magnetic force therebetween for supporting at least part of the weight of said door;
wherein said magnet means comprises an electromagnet, there being provided battery means mounted on said door and electrically connected to the electromagnet for exciting it; further including charging means for charging the battery means, said charging means comprising: a power source, and a secondary coil mounted on the door and electrically connected to the battery means, the secondary coil being selectively brought into coupling with the primary coil for charging the battery means.

9. A door apparatus according to claim 8, wherein the secondary coil is brought into electromagnetic coupling with the primary coil when the door is in the closed position.

* * * * *

UNITED STATES PATENT AND TRADEMARK OFFICE
CERTIFICATE OF CORRECTION

PATENT NO. : 4,698,876

DATED : October 13, 1987

INVENTOR(S) : Mitsuji Karita

It is certified that error appears in the above-identified patent and that said Letters Patent is hereby corrected as shown below:

Column 1, line 56: "spcifically" should read as --specifically--

Column 5, line 25: "of a generally C-shaped" should read as --of a generally C-shape--

Column 5, line 43: "of ech core" should read as --of each core--

Signed and Sealed this

Seventeenth Day of May, 1988

Attest:

DONALD J. QUIGG

Attesting Officer

Commissioner of Patents and Trademarks